July 1, 1969    J. O. NATWICK    3,453,374
RESILIENT ELECTRICAL CABLE
Filed May 3, 1968

INVENTOR.
JULIUS O. NATWICK
BY Philip Schneider
Louis B. Appleba
ATTORNEYS 3,453,374
RESILIENT ELECTRICAL CABLE
Julius O. Natwick, Niantic, Conn., assignor to the United States of America as represented by the Secretary of the Navy
Filed May 3, 1968, Ser. No. 726,286
Int. Cl. H01b 7/06, 11/02
U.S. Cl. 174—69                                6 Claims

ABSTRACT OF THE DISCLOSURE

A flexible resilient electrical cable comprising a resilient core covered by at least one layer of stranded conductors wound in a helix thereon. The conductors are limited in their stretchability by intermeshed locking strands which are also wound helically but in the opposite direction to the conductor helix. An outer insulative and resilient layer completes the cable. A strength member, which comprises a thread of non-resilient material, runs longitudinally through the center of the core. This prevents stretching of the cable during manufacture. The strength member loses its non-resiliency during the subsequent cable-curing process to allow the finished cable to exhibit its resilient characteristics.

---

The invention described herein may be manufactured and used by or for the Government of the United States of America for governmental purposes without the payment of any royalties thereon or therefor.

This invention relates to resilient electrical cables and especially to a resilient electrical cable having a non-resilient strength member running through its core during the manufacturing process.

The conventional electrical wire is usually a single solid conductor or a stranded conductor that is made up of two or more solid conductors which are either intertwined or paralleled. The ability of conventional wires to withstand stretching and extensive flexing without damage is very limited—they break when they are subjected to tensile stresses that exceed their yield point and also because of the fatigue which develops when they are repeatedly flexed.

Methods which have been used to provide flexible cables include forming the conventional electrical conductor into a sinusoidal shape to provide the required extra length of cable when tension is applied; forming the cable into a coiled cord; including a preformed spring wire in the group of electrical conductors; and putting the cable into compression when it is being manufactured.

Conventional elastic electrical cables have certain disadvantages which include the following: coiled cord cables usually require a larger spatial volume than straight cables; the length of the conductor in a coiled cord or a sinusoidally shaped conductor is greater and therefore the undesirable electrical resistance is greater; the electrical capacitance and inductance of the conductors change markedly with elongation and tend to limit the frequency range over which the cable is useful.

An object of this invention is to provide a resilient electrical cable of the straight-line type which is highly resistant to damage from flexure and stretching.

The objects and advantages of the invention are accomplished by winding conductors in a helical curve to form a layer over a resilient core and covering the conductive layer with resilient layer of insulating material. To permit manufacture of the cable without stretching during the process, the resilient core is formed with a non-resilient thread running through the length thereof, the thread being made of a material which loses its non-resiliency when heat is applied to the cable during the cable-curing process.

Other objects and advantages will appear from the following description of an example of the invention and the novel features will be particularly pointed out in the appended claims.

Figure 1:
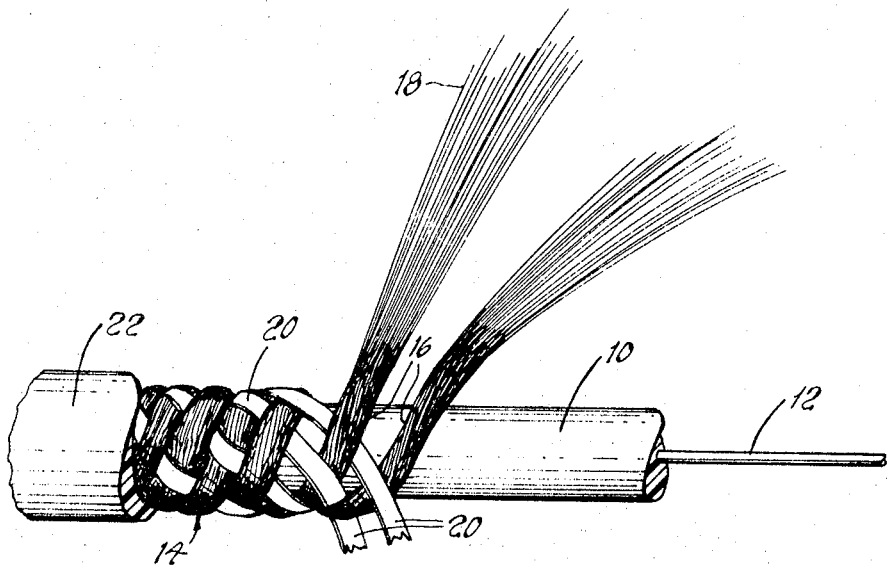
Figure 2:
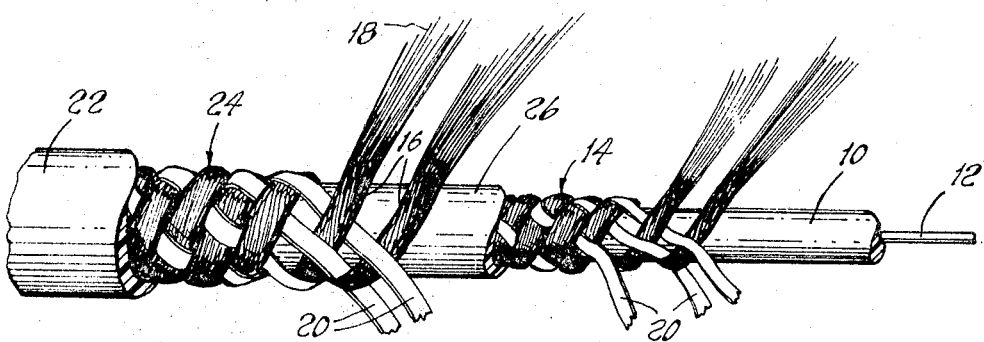

In the accompanying drawings:

FIG. 1 is an illustration of a single-conductor cable made in accordance with the invention with one end peeled away to show the internal structure; and FIG. 2 is an illustration of a two-conductor cable having an internal resilient insulative layer, one end of the cable being peeled away to show the internal structure of the cable.

The cable shown in FIG. 1 is a single-conductor resilient cable. It comprises a resilient core 10 made of an elastomeric material such as a silicone elastomer. Running longitudinally through the center of the core 10 is a thread (or strength member) 12 of a non-resilient material such as the polyester fiber known as Dacron. The material chosen for the strength member must be such that it loses its strength and non-resiliency as a result of the heat applied to the cable when it undergoes its curing process. Thus the cured cable will be resilient whereas the uncured cable will not.

A conductive layer 14 envelopes the core 10. The conductive layer 14 is formed by winding wire cords 16 around the core in a helical winding, each succeeding wire cord 16 lying next to the previous one so that no spaces exist between them. Each wire cord 16 consists of a plurality of strands of wire 18, which are twirled together.

Interlacing the wire cords 16 are locking strands 20 which are also wound in a helix which has a direction opposite to that of the helices formed by the wire cords 16, i.e., if the wire cord direction is clockwise, the locking strand direction is counterclockwise. The purposes of the locking strands are to hold the cable components together during the manufacturing process and to take up the tension before the wire cords when the cable is pulled, thereby protecting the wire cords from damage. This protection is accomplished by keeping the helix angle of the locking strands smaller than that of the wire cords. The limit would be the case where the helix angles are equal, and the locking strands are orthogonal to the wire cords. The locking strands are fabricated from a substantially non-resilient but strong material such as Teflon-coated glass or nylon materials which do not change their characteristics when subjected to the amount of heat needed to cure the elastomeric materials used in the cable.

Other layers of wire cords and their associated locking strands may be laid down over the first layer, if desired. The layers may be wound in the same direction as the first or in the opposite direction. Layers wound in opposite directions generate a greater amount of electrical noise, which may be tolerable in certain applications and intolerable in others. Additional layers result in greater cable strength and current-carrying capacity.

The final layer is the outer, resilient, insulative layer 22 which insulates the cable and protects it against damage. This layer may also be made of a silicone elastomer.

After the cable has been completed, the elastomers are cured by the usual heat treatment. During the curing process, the strength member 12 loses its tensile strength because of the heat and the cable becomes elastic.

FIG. 2 shows an embodiment having two conductive layers 14 and 24 with an elastomeric insulating layer 26 between them. This construction provides a two-conductor electrical cable.

A typical helix angle for the wire cords is 60° for a 30% stretch. This angle can, of course, be changed to provide different amounts of stretch to the cable.

The maximum amount of elongation that is desired is designed into a particular conductive layer and cable so that, when the cable is stretched, the diameters of the core, conductive layer and locking strands, and outer layer reduce at a predetermined rate so as to minimize the tension required for elongation, minimize wear on the various cable components and minimize the electrical noise generated by the sliding of the wires.

The present cable has: a lower level of undesirable self-generated noise than conventional electrical cables because the lay of the cords is such that there is little movement between the cords during flexing or elongation; a very low change in resistance, capacitance and inductance at the audio and sonic frequency ranges; a low tensile stress for elongating the cable; and a negligible tension set.

The construction can be varied so as to: (1) accommodate the same or different gauges of wire within the same cable; (2) control the resistance, capacitance and inductance characteristics of the conductor and cable; (3) control the elongation characteristics i.e., the amount of elongation set, and the force required to stretch the conductor and/or cable; and (4) control the limpness and flexiblity of the conductor or cable.

It will be understood that various changes in the details, materials, and arrangements of parts (and steps), which have been herein described and illustrated in order to explain the nature of the invetnion, may be made by those skilled in the art within the principle and scope of the invention as expressed in the appended claims.

I claim:
1. An extensible electrical cable comprising, in combination:
   a core of extensible material;
   a longitudinal member running through said core, said member being fabricated from a material which is substantially non-extensible but loses its strength upon subjection to heat;
   at least one conductive layer comprising wire cords wound helically around said core and locking strands of substantially non-resilient material interlaced through said wire cords and wound helically in the direction opposite to the direction of the wire-cord helix,
   the helix angle of the locking strands being less than the helix angle of the wire cords; and
   a layer of insulation surrounding said conductive layer, said layer of insulation being fabricated from a resilient material having electrically insulating properties,
   said longitudinal member acting to keep said cable from stretching during the manufacturing process and having its non-extensible characteristic destroyed by the curing process required by said core and insulative layer.

2. A cable set forth in claim 1, further including:
   at least one additional conductive layer,
   a layer of insulation lying between each two adjacent conductive layers, said insulation being fabricated from a resilient material having electrically insulating properties.

3. A cable as set forth in claim 1, wherein said core and said layer of insulation are fabricated from elastomeric material.

4. A cable as set forth in claim 3, wherein said locking strands are fabricated from glass coated with polytetrafluoroethylene.

5. A cable as set forth in claim 3, wherein said locking strands are fabricated from nylon.

6. A process for making an extensible electrical cable comprising the steps of:
   surrounding a longitudinal non-extensible member with a covering of resilient, non-conductive material forming a longitudinal core;
   winding around said longitudinal core at least one conductive layer comprising wire conductors, said conductors being wound in a helix;
   interlacing said wire conductors with locking strands of substantially non-resilient material, said locking strands also being wound helically but in a direction opposite to that of said wire-conductor helix and with a helix angle that is less than that of the wire-conductor helix;
   placing a layer of resilient insulating material around said conductive layer; and
   treating the cable assembly thus formed with sufficient heat to destroy the non-extensibility of said non-extensible member but not sufficient heat to destroy the herein-defined characteristics of the other cable components.

References Cited

UNITED STATES PATENTS 2,488,527  11/1949  Dutcher _____ 174—69
3,014,087  12/1961  Kaplan _____ 174—69
3,100,240   8/1963  McKirdy _____ 174—69

DARRELL L. CLAY, *Primary Examiner.*

U.S. Cl. X.R.

174—113, 131; 264—173